(12) United States Patent
Keller

(10) Patent No.: US 7,896,578 B2
(45) Date of Patent: Mar. 1, 2011

(54) MAPPING OF CONTAMINANTS IN GEOLOGIC FORMATIONS

(76) Inventor: Carl Keller, Santa Fe, NM (US)

( * ) Notice: Subject to any disclaimer, the term of this patent is extended or adjusted under 35 U.S.C. 154(b) by 0 days.

(21) Appl. No.: 12/215,777

(22) Filed: Jun. 30, 2008

(65) Prior Publication Data

US 2009/0003934 A1    Jan. 1, 2009

Related U.S. Application Data

(60) Provisional application No. 60/937,574, filed on Jun. 28, 2007.

(51) Int. Cl.
*E21B 49/08* (2006.01)
*E21D 11/00* (2006.01)

(52) U.S. Cl. .................. 405/150.1; 166/264; 436/25; 422/56

(58) Field of Classification Search .............. 436/25; 422/56

See application file for complete search history.

(56) References Cited

U.S. PATENT DOCUMENTS

| | | | | |
|---|---|---|---|---|
| 3,589,356 | A * | 6/1971 | Silverman | 600/7 |
| 4,778,553 | A * | 10/1988 | Wood | 156/287 |
| 5,176,207 | A | 1/1993 | Keller | |
| 5,246,862 | A * | 9/1993 | Grey et al. | 436/28 |
| 5,377,754 | A | 1/1995 | Keller | |
| 5,466,093 | A * | 11/1995 | Keller | 405/152 |
| 5,803,666 | A | 9/1998 | Keller | |
| 5,804,743 | A | 9/1998 | Vroblesky et al. | |
| 5,853,049 | A | 12/1998 | Keller | |
| 6,026,900 | A | 2/2000 | Keller | |
| 6,109,828 | A | 8/2000 | Keller | |
| 6,244,846 | B1 | 6/2001 | Keller | |
| 6,283,209 | B1 | 9/2001 | Keller | |
| 6,298,920 | B1 | 10/2001 | Keller | |
| 6,849,414 | B2 * | 2/2005 | Guan et al. | 435/7.1 |
| 6,910,374 | B2 | 6/2005 | Keller | |
| 7,281,422 | B2 | 10/2007 | Keller | |
| 7,334,486 | B1 * | 2/2008 | Klammler et al. | 73/861.07 |
| 2004/0065438 | A1 | 4/2004 | Keller | |
| 2005/0172710 | A1 | 8/2005 | Keller | |

(Continued)

OTHER PUBLICATIONS

Keller and Travis "Evaluation of the Potential Utility of Fluid Absorber Mapping of Contaminants," Proceedings of the 7th National Outdoor Action Conference, Las Vegas, May 25-27, 1993, pp. 421-435.*

(Continued)

*Primary Examiner*—Yelena G Gakh
*Assistant Examiner*—Michelle M Adams
(74) *Attorney, Agent, or Firm*—Rod D. Baker

(57) ABSTRACT

An apparatus and method for evaluating chemicals of interest in a subsurface bore hole, such as a groundwater sampling well. An absorbent member is attached to a flexible liner, and the liner is everted by fluid pressure down the borehole. The everted liner presses the absorbent member against the wall of the borehole. Any chemicals of interest are absorbed into the absorbent member from the media surrounding the borehole. The liner, with associated absorbent member thereon, is then extracted from the borehole. The absorbent member may then be subjected to any suitable laboratory analysis to evaluate the type, spatial distribution, and concentration of chemicals of interest, such as water contaminants occurring in the borehole.

25 Claims, 8 Drawing Sheets

U.S. PATENT DOCUMENTS

2007/0260439 A1    11/2007    Keller

OTHER PUBLICATIONS

"NAPL FLUTe," [online], [retrieved on Sep. 29, 2009]. Retrieved from the Internet: <http://web.archive.org/web/20070524230058/www.flut.com/sys_3.html>, publicly available May 24, 2007.*

Keller ("Improved spatial resolution in vertical and horizontal holes for measurement of bioremediation parameters and histories," Remediation of hazardous waste contaminated soils; Wise and Trantolo, Ed., Ch. 23, pp. 513-541).*

Cherry et al. ("A new Depth-Discrete Multilevel Monitoring Approach for Fractured Rock," Ground Water Monitoring & Remediation 2007, 27, 57-70, published online May 7, 2007).*

\* cited by examiner

Fig. 1A
Side View
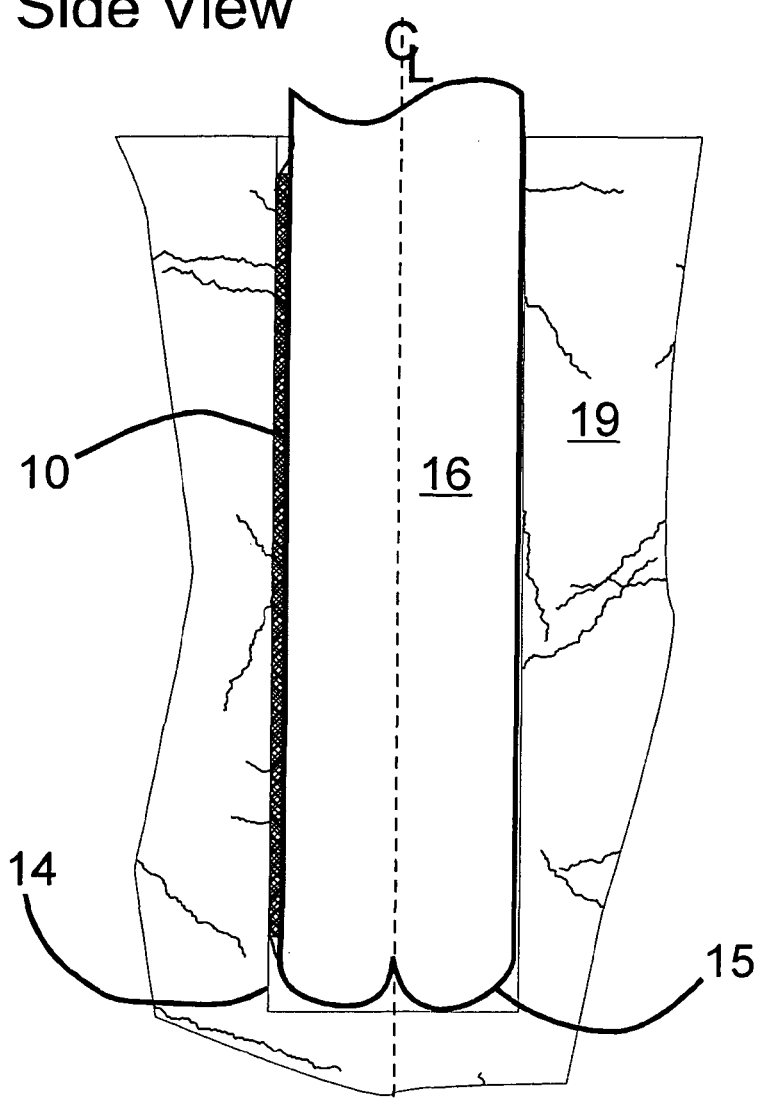
Top View
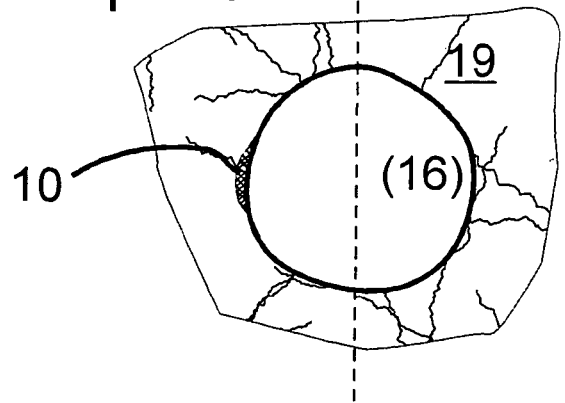
Fig. 1B

Fig. 3A
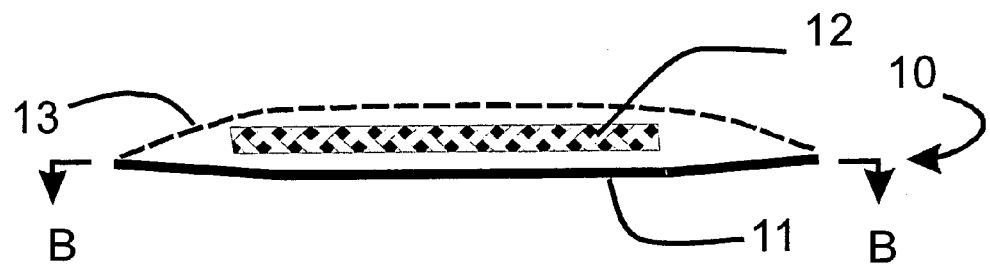
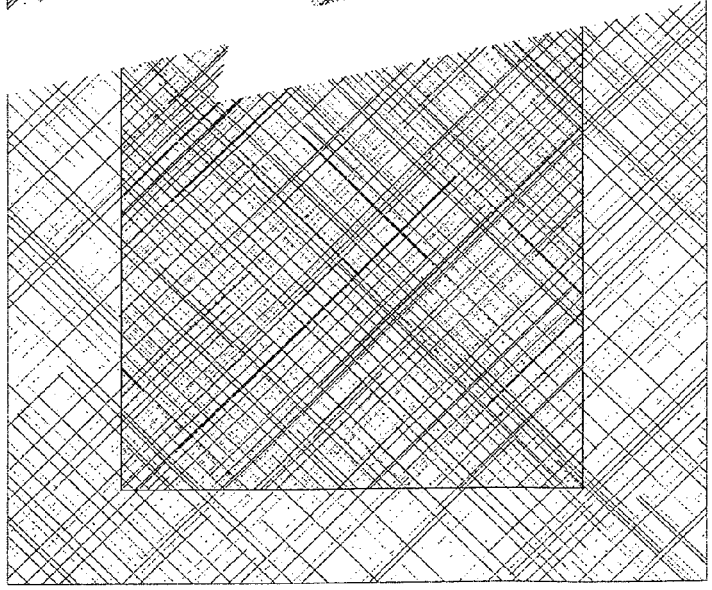
Fig. 3B

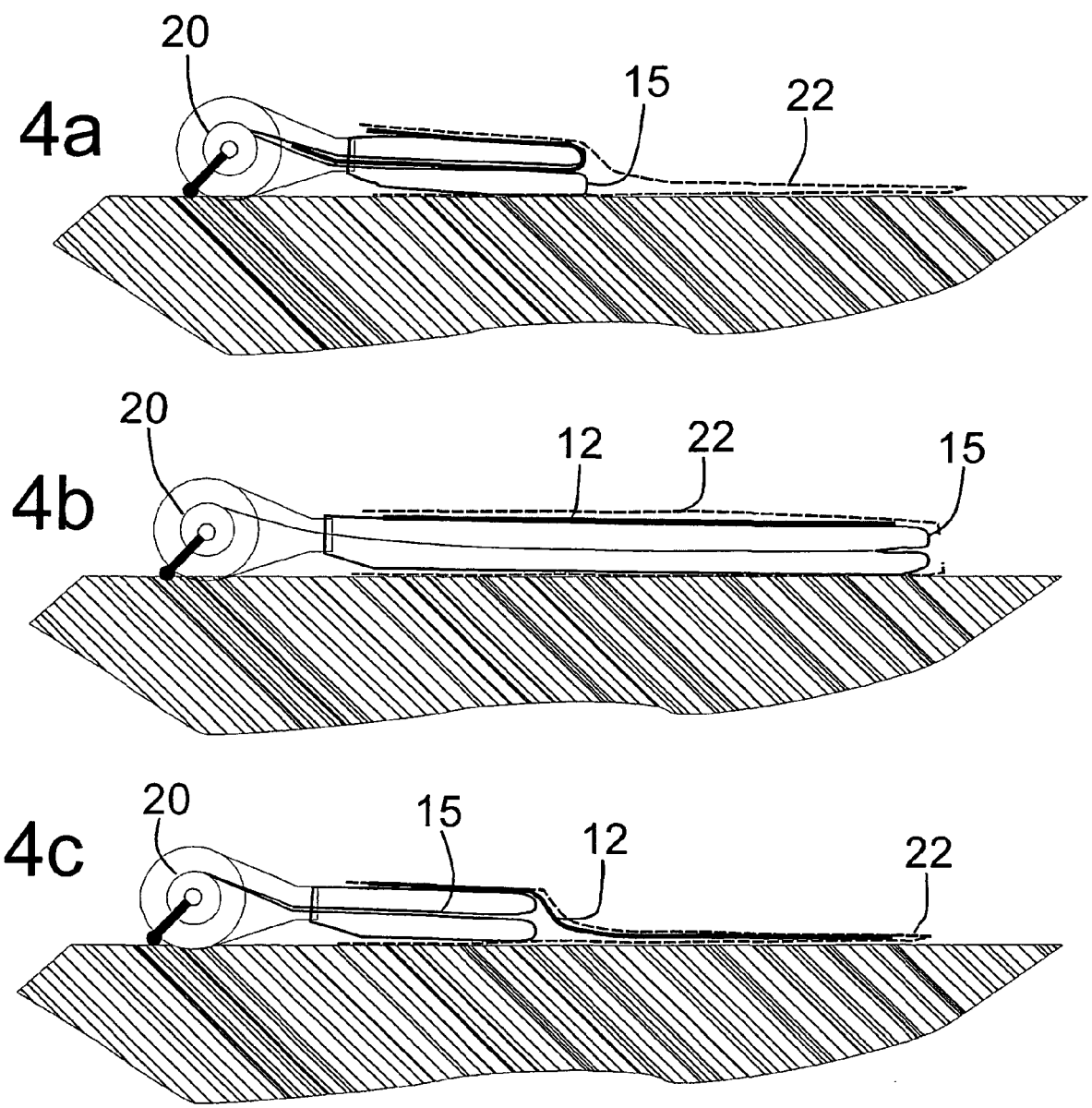

MAPPING OF CONTAMINANTS IN GEOLOGIC FORMATIONS

CROSS-REFERENCE TO RELATED APPLICATIONS

This application claims the benefit of the filing of U.S. Provisional Patent Application Ser. No. 60/937,574, titled "Mapping of Contaminants in Geologic Formations," filed on Jun. 28, 2007, and the specification thereof is incorporated herein by reference.

BACKGROUND OF THE INVENTION

Background Art

Many kinds of harmful chemicals are found beneath the surface of the ground, due to many human activities. Those chemical contaminants propagate into the pore and fracture fluids of the subsurface geologic formations, and contaminate aquifers, including those used as drinking water sources. The contamination must be found, and its extent determined, in order to be removed, or to prevent further contamination of ground water resources. A common method of mapping the distribution of subsurface contamination is to collect fluid samples from ordinary sampling wells drilled into the ground in and around the area of suspected or known contamination.

There remains an unmet need for a simple yet accurate and reliable apparatus and method for ascertaining and mapping the spatial extent of underground pollution. The present disclosure addresses this need. The presently disclosed apparatus and method, developed for the fine spatial measurement of contaminants in subsurface geologic formations, particularly those below the water table, are innovative extensions of the borehole flexible liner technologies disclosed by the present Applicant in U.S. Pat. Nos. 5,176,207 and 6,910,374, as well as in U.S. Utility patent application Ser. No. 11/800,193, entitled "Flexible Borehole Liner with Diffusion Barrier," filed May 4, 2007. U.S. Pat. No. 5,804,743 also provides useful background for the present disclosure.

SUMMARY OF THE INVENTION

Disclosure of the Invention

This invention provides a means of determining the distribution and concentration of contaminants subsurface in boreholes with much better resolution than that which can be obtained from the normal collection of ground water samples in open holes. The use ranges from monitoring of landfill leakage to identification of contaminants in small fractures and pore water in geologic formations deep underground in saturated or unsaturated conditions.

There is provided an apparatus for evaluating underground contamination, the apparatus disposable in a borehole having a borehole wall, the apparatus comprising: a flexible liner disposable in the borehole by eversion; and at least one absorbent member disposed upon the liner, the absorbent member comprising: an outer layer for temporarily isolating the absorbent material from contaminants; and an absorbent material, disposed between the liner and the outer layer, for absorbing any contaminants occurring in the borehole.

There also is disclosed hereby an apparatus for evaluating underground contamination, the apparatus disposable in a borehole having a borehole wall, and the apparatus comprising: a liner disposable in the borehole; and an absorbent member disposed upon the liner, the absorbent member comprising: an outer layer for isolating the absorbent material; and an absorbent material disposed between the liner and the outer layer. In the apparatus, when the apparatus is disposed in a borehole, the liner is urged toward the borehole wall by a fluid pressure inside said liner, and the absorbent member is pressed against the borehole wall by the liner.

Accordingly, there also is provided a method for evaluating contamination in a borehole, comprising the steps of: providing a flexible liner; attaching at least one absorbent member upon the liner; disposing the flexible liner and absorbent member down the borehole; allowing the absorbent member to absorb contaminants from the borehole; withdrawing the flexible liner and absorbent member from the borehole; and evaluating the absorbent member for contaminants absorbed therein.

A primary object of the present invention is to provide a means and method for directly determining the chemical conditions at discrete locations of the Earth's subsurface.

Another object of the present invention is to permit accurate and reliable evaluation and determination of subsurface contamination, particularly groundwater.

A primary advantage of the present invention is that it permits the type and extent of subsurface pollution to be measured comparatively quickly and with improved accuracy.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1A is a side sectional view of an embodiment of the apparatus according to the present disclosure, situated within a subsurface borehole;

FIG. 1B is a top sectional (radial) view of the apparatus depicted in FIG. 1A, situated within a subsurface borehole;

FIG. 3A is an enlarged cross-sectional view of an embodiment of the composite absorbent strip according to the apparatus of the present disclosure;

FIG. 3B is a front view of the absorbent apparatus depicted in FIG. 3B

FIGS. 4A-C are side views illustrating sequentially a possible mode or practicing, above the surface of the ground, a method according to the present disclosure;

DESCRIPTION OF THE PREFERRED EMBODIMENTS

Best Modes for Carrying Out the Invention

Analysis and evaluation of subsurface pollution is typically performed in sampling boreholes or wells, or other wells, in an area of concern or study. The testing method may be as simple as periodically retrieving samples of the water standing in a well (e.g., from at or near the water surface), and subjecting it to off-site testing.

The apparatus and method of the present disclosure is contemplated for use primarily in subsurface boreholes drilled into the earth, but the invention is not so limited. The invention potentially may find utility in various pipes and conduits, including pipelines and the like in buildings and above the surface of the ground. Throughout this disclosure and in the claims, "borehole" shall have a meaning including man-made conduits such as pipes and tubes, as well as subsurface boreholes serving as sampling wells. "Contaminant" means any chemical compound of interest, regardless whether it is an actual contaminant of drinking water.

The apparatus and method use an everting borehole liner to perform subsurface fluid conductivity measurements. The liner apparatus is similar in some respects to the device described in U.S. Pat. No. 5,803,666, the disclosure of which is incorporated herein by reference. The techniques and mechanisms of this disclosure use an everting liner, disposed in a bore hole, to permit discrete spatial resolution and analysis of chemical conditions along at least a selected length of the hole. To "evert" means to "turn inside out;" as a flexible, collapsible, tubular liner is unrolled from a spool, it simultaneously is topologically reversed so the outside surface of the tube becomes the inside surface. The liner is everted into the borehole, such as a vertical sampling well for example, with pressurized fluid in the liner. As the liner descends the borehole, an absorbent strip component is pressed against the borehole wall by the fluid pressure within the liner. Careful regulation of liner eversion allows absorbent strip members to be placed with considerable positional precision, particularly as to distance below ground surface (and thus also in relation to water table). This in turn permits contaminant sampling at selected locations along the length of the borehole. Both the hardware design and the method of analysis are described hereafter. Thus an advantage of the technique is that it allows for finer resolution, as a function of borehole depth and/or situation on the borehole circumference, of contaminant location.

Figure 2:
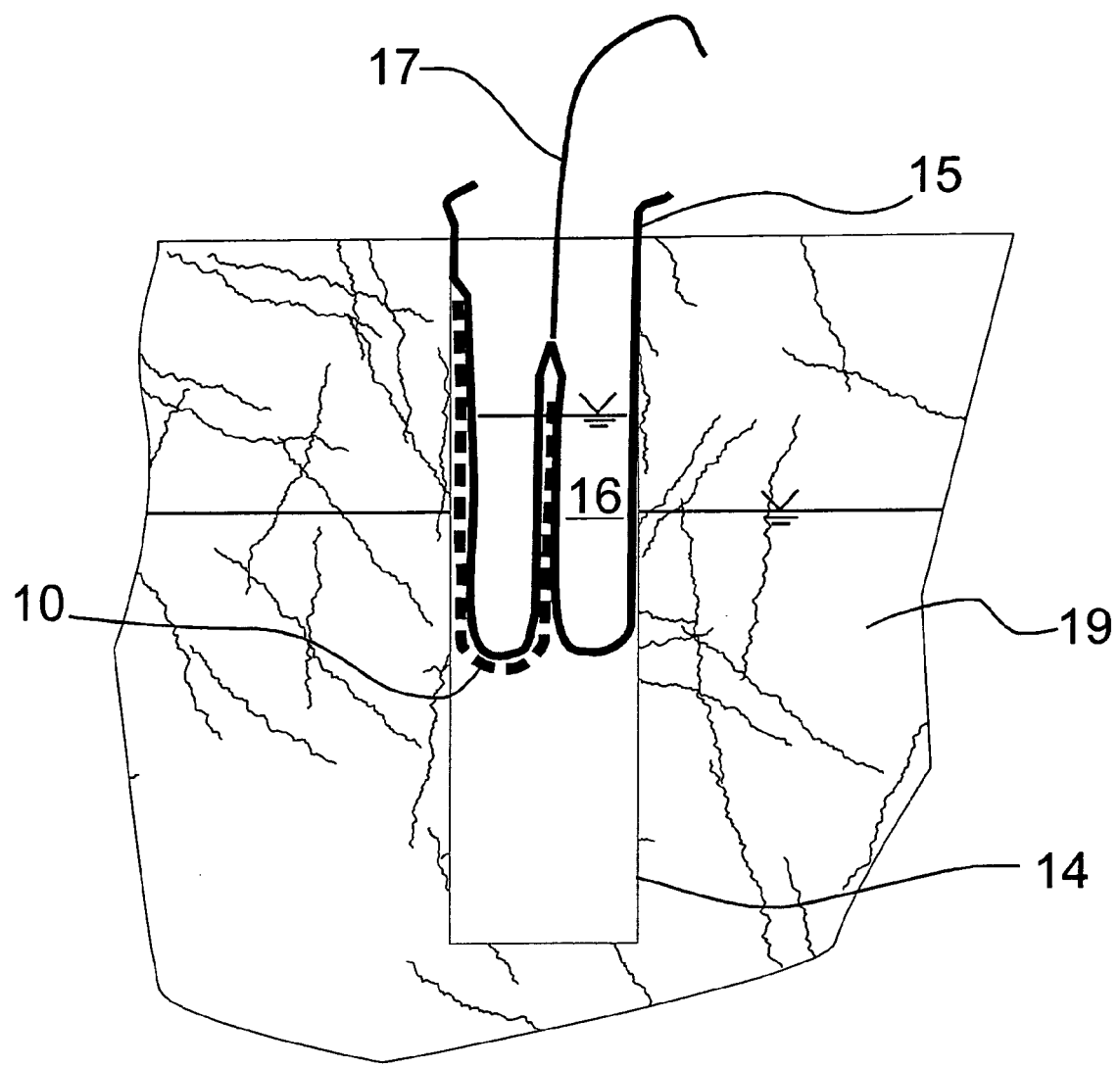
FIG. 2 is a side sectional view illustrating the installation of an embodiment of the disclosed apparatus, according to a possible method of the present disclosure.

Reference is invited to FIGS. 1A, 1B, and 2. The presently disclosed measurement apparatus uses an absorbent member 10 (including the possibility of a continuous absorbent member) attached to a flexible liner 15. The liner 15 with (control and retrieval cable 17) is everted into a borehole in a subsurface formation 19, as shown in FIG. 2. A fluid 16 (for example water) is controllably disposed into the interior of the liner 15 to pressurize the liner, causing it to dilate radially outward; the dilation presses the absorbent member 10 firmly against the borehole wall 14. The general means and modes of everting subsurface borehole liners are described in U.S. Pat. No. 5,176,207 and U.S. Pat. No. 6,910,374. After a period of time, the flexible liner 15 is then retracted (e.g., retrieved to the surface of the ground using cable 17), by inversion, from the borehole. The absorbent member 10 can then be chemically analyzed with or without detaching it from the liner 15, depending on the particular embodiment of the apparatus deployed. Analysis may be performed for substances, including contaminants, absorbed by the member 10 while it was in intimate contact with the borehole wall 14.

The present method is substantially different from the diffusion bag method described in U.S. Pat. No. 5,804,743 for the collection of contaminants from borehole water by the use of a water-filled waterproof film bag. The presently disclosed apparatus and method are directed to the mapping of in situ contamination in the pore fluids of the geologic formation, without the effect of contamination in the borehole water. By the emplacement of the liner 15 immediately after the hole is drilled, the pore fluids in the surrounding formation have less time for contact with the borehole water. Once the liner 15 is in place, the borehole is effectively sealed, the effect of the open borehole is terminated, and the fracture flows are expected to return to their state prior to the drilling of the hole. The equilibrium concentrations in the absorbent member 10 are more characteristic of the natural state without the potentially adverse effect of the mixing of formation water in the open hole.

Thus an aspect of the present disclosure is the construction of an absorbent member 10 suitable for reliable use on the everted liner. An absorbent member 10 is provided that promotes a reliable measurement of absorbed substances, but without the misleading absorption of extraneous contaminants during installation and removal, especially below the water table. The absorbent member 10 also is protected from the gain or loss of contamination to or from the liner, or to or from the interior of the liner—the object being to obtain the most accurate measurement possible of subsurface conditions as they exist in situ. Another feature of the present apparatus is that it is sufficiently rugged to endure the mechanical loads of the emplacement in the several procedures described. Other features of the present apparatus allow it to be used in operative conjunction with the several flexible liner emplacement techniques described in the patents mention previously herein.

As mentioned, the absorbent member 10 is pressed against the borehole wall 14 by the liner 15, which is urged against the wall by the pressure of the fluid 16 inside the liner (FIGS. 1A, 1B and 2).

An embodiment of the absorbent member 10 may be configured as illustrated in FIG. 3. The absorbent member 10 includes an inner diffusion barrier 11, an outer layer 13, and an absorbent material 12 (of various configurations and compositions, depending upon the contaminant of concern), disposed between the barrier 11 and the outer layer 13. The outer layer 13 provides temporary isolation of the absorbent material 12.

The diffusion barrier 11 prevents chemical transport, by diffusion, from the liner 15 (or from the fluid 16 within the liner) into the absorbent material 12. The diffusion barrier 11 may be a laminate of a thin metal film and a plastic substrate. The diffusion barrier 11 may be reinforced with a strong backing (on the side opposite the absorber material 12) to prevent tearing of the laminated film during the installation procedure.

The absorbent material 12 preferably is fashioned from activated carbon felt; alternatively, the absorbent material may be composed of any of a variety of materials, or combinations of materials, such as a felt of cotton, polypropylene fibers, activated carbon cloth, or granular carbon in a supporting gel such as edible gelatin. A main characteristic of the absorbent material 12 is that it can absorb, by diffusion or similar processes, one or more contaminants of interest after the contaminant(s) passes through the outer layer 13.

By carefully selecting the absorbent material 12, a wide range of contaminants can be assessed. In one embodiment, the absorbent material 12 can be "developed," somewhat like photographic film, using chromatographic or similar laboratory techniques to provide a color map of the contaminant distribution.

The outer layer 13 is not waterproof. It may be hydrophobic, for example if made from a perforated polyethylene felt, or it may simply be a tightly woven fabric. Principal purposes of the outer layer 13 are to contain the strip of absorbent material 12, and to prevent the immediate saturation of the absorbent material 12 with the ambient water residing in the borehole while the absorbent member 10 is everted from within inside the inverted liner (FIG. 2) to its working position against the borehole wall 14 (FIGS. 1A and 1B). Intimate contact with the resident borehole water could contaminate the absorbent strip 12 before it is pressed against the borehole wall 14, where the actual sampling is sought to be obtained.

The diffusion barrier 11 may be fabricated of a thin laminate of Mylar® polyethylene terephthalate material, aluminum foil, or low density polyethylene films. This material has been tested as a very effective barrier to volatile organic compounds such as trichloroethylene, a common contaminant of ground water. Suitable diffusion barrier materials and designs, adaptable for use in this apparatus, are known in the food packaging industry and other fields of endeavor.

The absorbent member 10 is manufactured in, for example, a long flattened oblate form. A single absorbent member 10 may be provided along the full length of the liner 15 within the bore hole (as suggested by FIG. 1A), or in alternative embodiments discrete absorbent members may be disposed at selected positions on the liner. The absorbent member 10 is attached to the outside of the liner 15 by a suitable means such as heat welding, buttons, or hook and loop attachments. The attachment of the absorbent member 10 to the liner 15 may be temporary yet secure—i.e., a connection which allows for a deliberate detachment of the member 10 for analysis—or substantially permanent.

The absorbent member 10 must be relatively thin, to allow the pressure of the fluid 16 to effectuate a reliable seal between the liner 15 and the bore hole wall 14 (except where the absorbent member 10 itself contacts the wall 14), to prevent contaminant transport in the interstitial space of the liner, absorbent member, and the bore hole wall.

The absorbent member 10 optionally may be attached to the liner 15 at its top and bottom ends only. The liner 15 may be manufactured with the absorbent member 10 directly attached so that, in one mode of emplacement, the liner 15 can be everted into the borehole, taking with it the member 10. A vent tube (not shown in the drawing figures) may be deployed to allow ambient groundwater to flow from the borehole as the liner 15 descends. (Otherwise, the liner 15 will force water resident in the borehole into the surrounding formation. This process is described in U.S. Pat. No. 6,910,374; in the absence of venting, the liner installation of the present disclosure optionally may have the additional purpose of measuring the transmissivity distribution of the surrounding media as described in that patent.) As the liner 15 everts, the absorbent member 10 is pressed firmly against the borehole wall 14. The borehole wall 14 may be composed of granular sediments, or porous and fractured rock, or other geologic constituent. In the simplest emplacement method according to this disclosure, the geologic formation must support an open and stable hole.

After the liner 15 is installed down-hole, the outer layer 13 of the absorbent member 10 contacts the wall 14 of the borehole. The outer layer 13 allows pore fluids (and associated contaminants in the pore fluid) of the surrounding formation to pass there-through by direct flow. However, the outer layer 13 has a relatively low permeability, which slows transport of pore fluid from the surrounding geologic media into the absorbent member 10. Significant, possibly deleterious, contact of the absorbent material 12 with the ambient borehole water during the emplacement thereby minimized.

Once the apparatus is in place with the absorbent member 10 pressed firmly against the borehole wall 14 by the liner 15, any contaminants resident in the pore or fracture water of the surrounding media can migrate into the absorbent material 12. The apparatus is left in place in the borehole so that contaminant distribution in the borehole wall 14 is allowed to equilibrate with the contaminant distribution in the absorbent material 12 within the absorbent member 10. In this manner, the distribution of contaminants in the pore space of the borehole wall 14 is directly correlated to the contaminant distribution in the adjacent absorbent layer 12. After a time period adequate to realize a steady state of the absorbent material 12 relative to the media of the borehole wall 14, the liner 15 is inverted from the borehole, carrying with it the absorbent member to the surface. The inverting liner 15 (which may be illustrated by FIG. 2) prevents further contact with the wall 14, and the outer layer 13 of the absorbent member 10 protects against significant contact with the ambient borehole water during liner inversion.

Upon retrieval from the borehole and being brought to the surface, the absorbent member 10 may be processed for evaluation of the contaminants, if any, absorbed into the absorbent material 12. This may be accomplished in any suitable manner, but one preferred mode is disclosed with reference to FIGS. 4A-C. In the illustrated embodiment, the absorbent member 10 is detachable from the liner 15, and runs along all or substantial portion of the liner's length.

Having been extracted (by "inversion") from the borehole, the liner 15 with associated absorbent member 10 may be wound upon a reel 20. The liner 15 then is then paid out from the reel 20 and everted (a second time) into a suitable protective tubular bag 22 (FIG. 4A). The protective bag 22 may, but need not necessarily, be manufactured of the same diffusion barrier material as the diffusion barrier 11 layer of the absorbent member 10. With the everted liner 15 distended into the bag 22 (FIG. 4B), the absorbent member is exposed (within the bag), permitting access to the member for processing. The absorbent member 10 is disconnected from the liner 15 at its bottom end. The end of the absorbent member 10 is gripped (via an aperture in the protective bag 22) and held in place, within the bag 22, while the liner 15 is withdrawn, e.g., by being re-wound upon the spool 20. Withdrawing the liner 15 from the tubular bag 22 by inversion, as illustrated in FIG. 4C, leaves the strip of absorbent member 10 in the tubular bag where it is protected from loss of the volatile contaminants absorbed in the absorbent material 12. The absorbent member 10 contained in the protective tubular bag 22 may then be transported to a laboratory for a quantitative assessment of the contaminant distribution in the absorbent material 12, which in turn can be directly related to the contaminant special distribution, as well as concentration, in the pore fluids of the geologic formation. For radioactive pollutants such as tritium, the absorbent member 10 may be passed through a radiation detector for continuous assessment, along the member's length, of the concentration distribution of the radionuclide. An advantage of assessment per the present processes is that the spatial resolution is far better than that obtained in the more laborious conventional manners (e.g., by extracting the pore fluids from core samples of the geologic formation). Notably, the actual spatial distribution of contaminants, as they occur in the geologic formation (or other media) surrounding the borehole can be ascertained, in addition to types and concentrations.

Figure 5:
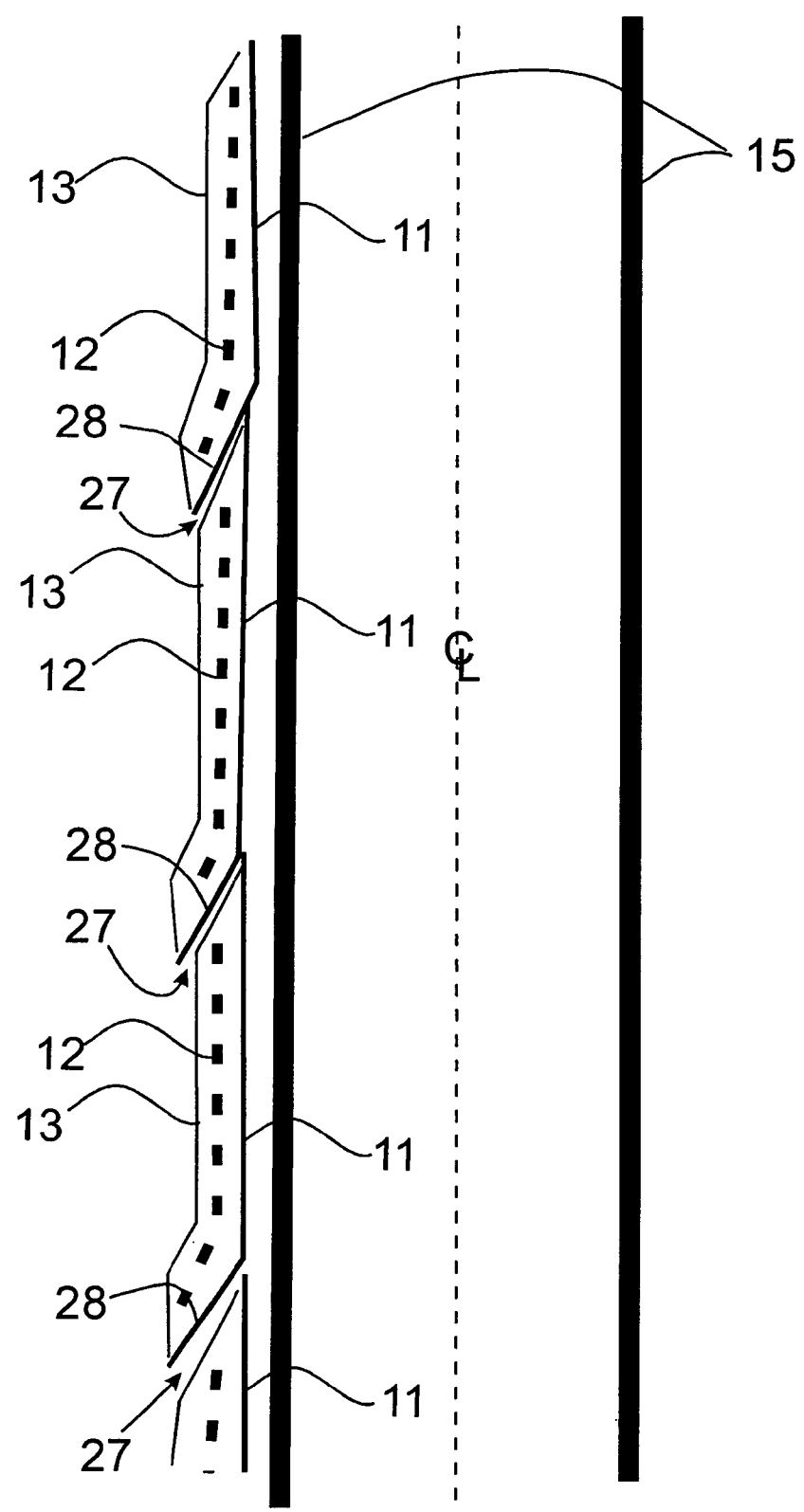
FIG. 5 is an enlarged side sectional view of a portion of an alternative embodiment of an apparatus according to the present disclosure as it may appear when disposed with a down-hole liner for use.

The absorbent material 12 may be segmented along it longitudinal axis to inhibit or prevent contaminant migration in the absorbent material independently of the contaminate distribution in the geologic formation. Small gaps are defined in the absorbent material 12, and the pressure of the fluid 16 within the liner 15 forces the diffusion barrier 11 to fill the gaps, providing a barrier to migration between segments of the absorber material 12. FIG. 5 illustrates a related embodiment, in which the absorbent member 10 is segmented by gaps 27. The segments are overlapped so to position portions 28 of the diffusion barrier 11 within the gaps 27, preventing migration of contaminants between segments. This safeguard is more important if the absorbent member 10 is to be left in place for an extended period of time.

Figure 6A:
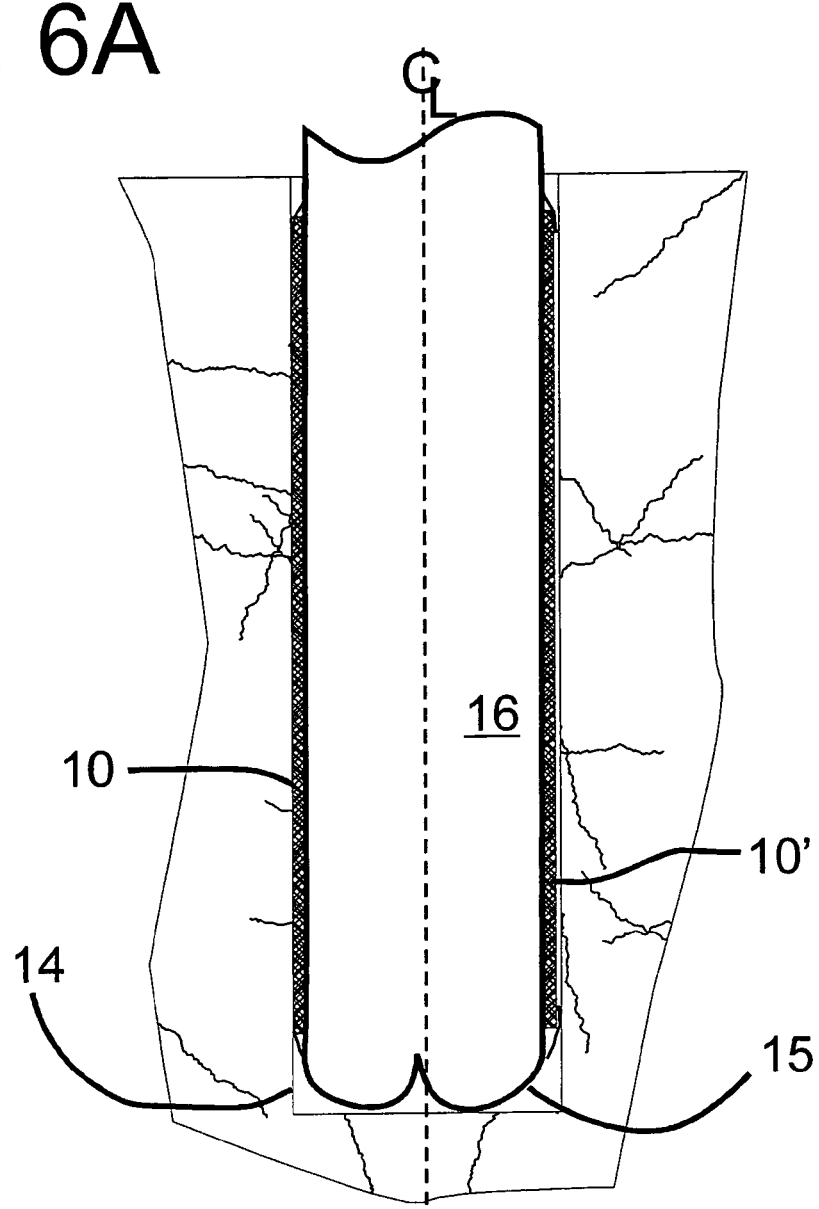
FIG. 6A is a side sectional view of a portion of another alternative embodiment of an apparatus according to the present disclosure, situated within a subsurface borehole.
Figure 6B:
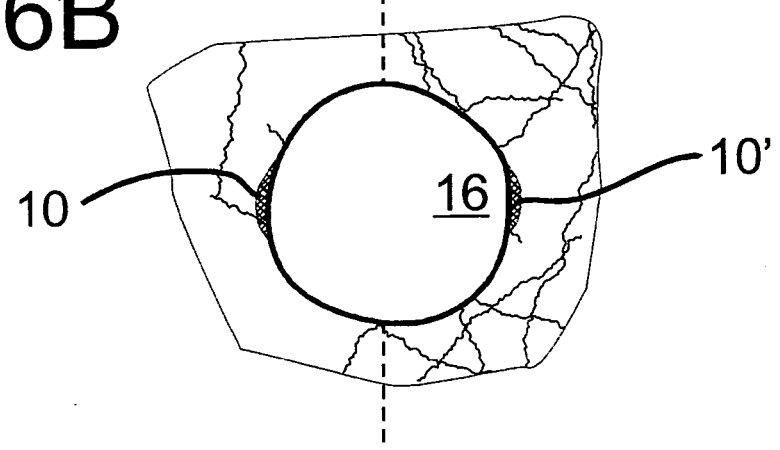
FIG. 6B is a top sectional (radial) view of the apparatus depicted in FIG. 6A.

FIGS. 6A and 6B illustrate the use of two physically separate absorbent members 10, 10'. The absorbent members 10, 10' may be disposed on diametrically opposite sides of the liner 15 as seen in FIGS. 6A and 6B, or side-by-side. Use of a pair of absorbent members 10, 10' allows a first absorbent member 10 to be evaluated on a large scale for a "gross" general determination of regions of contamination. The basic types and general locations of contaminants may be determined using, for example, faster or relatively less expensive testing techniques. After generalized evaluation has informed judgment about large-scale conditions, respective portions of the second absorbent member 10' can be analyzed (e.g., using more sensitive testing) on a smaller scale for higher spatial resolution.

Figure 7:
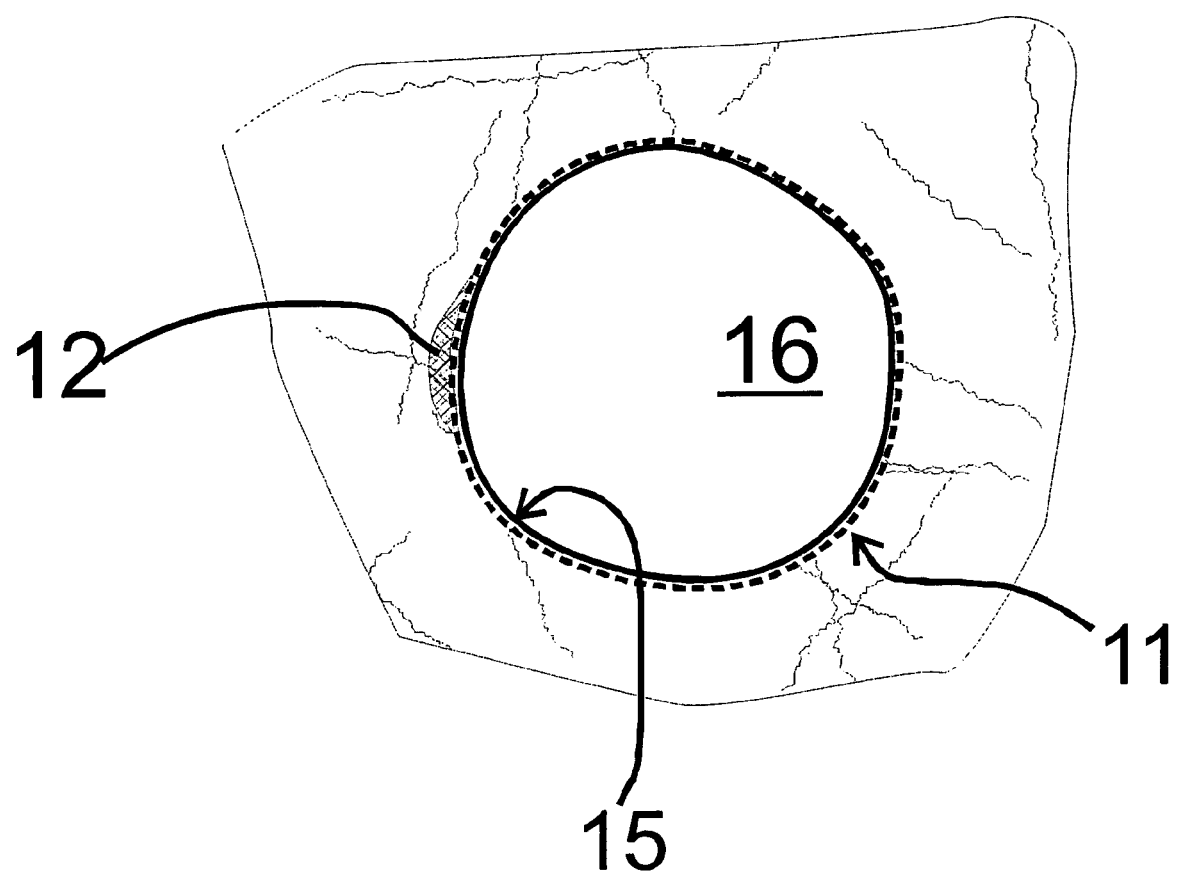
FIG. 7 is a top sectional (radial) view of yet another alternative embodiment of an apparatus according to the present disclosure, situated in a subsurface borehole.

Reference is made to FIG. 7, depicting an alternative embodiment in which the diffusion barrier 11 forms a complete surround of the liner 15. An advantage of this embodiment is the prevention of all ambient pore fluid contact with the liner 15. When the liner 15 and the diffusion barrier 11 are inverted (for example during the extraction of the liner 15 from the borehole), the surrounding diffusion barrier 11 defines a protective cover for the absorbent material 12. The absorbent material 12 thus protectively enveloped in the diffusion barrier 11 may then be transported for analysis with reduced concern of loss of the contaminants from the apparatus.

In yet another alternative methodology, called by the Applicant the NAPL FLUTe (non aqueous phase liquid, flexible liner underground technology) process, the absorbent material 12 is disposed between a color-reactive outer hydrophobic layer 13 and the liner 15.

The NAPL FLUTe embodiment preferably is emplaced using the technique disclosed in U.S. Pat. No. 6,298,920. The color-reactive cover layer 13 and the absorbent material 12 may be recovered by the same inversion process. It is common practice, of course, to emplace a rigid case or lining (e.g., a pipe) to support a borehole wall 14 while drilling a sampling or other well. In this embodiment of the method, the rigid case support of the borehole wall is later replaced with the support of the inflated flexible liner 15. However, if the inflated liner 15 is installed within the interior of the rigid liner and to the bottom of the borehole, and the users then pull upward on the rigid liner to extract it from the borehole, the drag of the rigid liner on the inflated flexible liner prevents the former from being withdrawn without risking tearing the flexible liner.

Thus, alternative embodiments of the apparatus and method have been devised that are useful especially in formations which do not allow an open stable borehole without some form of support. One such alternative methodology is to install the flexible liner through rigid casing, as described in U.S. Pat. No. 6,298,920 incorporated here by reference. In such a case, the liner 15 is not necessarily placed by eversion; rather, the liner is placed into the interior of a rigid casing liner, and the casing is then withdrawn to allow the liner 15 and its associated absorbent member 10 to dilate against the borehole wall 14.

In this NAPL FLUTe alternative methodology, a rigid liner is first installed in the borehole. A flexible liner with the reactive cover layer is then placed down the borehole, within the interior of the rigid liner. A quantity of water is added to the annular space between the flexible liner and the rigid casing liner. Gravity drives a flow of the water downward in the space between flexible liner and the rigid liner, causing a fluid pressure to be applied to the outside of flexible liner. Water is added till the annular fluid pressure equals the interior pressure of the flexible liner, and/or the flexible liner is displaced until the fluid pressures equilibrate. This eliminates the differential pressure that formerly forced the flexible liner against rigid liner. Because the flexible liner, with the reactive cover layer, is no longer pressing the inside wall of the rigid liner, the drag of the flexible liner against rigid liner is nearly eliminated.

Once the differential pressure in flexible liner is minimized, the rigid liner may be lifted from the borehole, leaving the flexible liner in place. When the flexible liner dilates outward against the borehole wall, which is uncovered as the rigid liner is withdrawn, the fluid in the annular space is lost to the surrounding formation. The full differential pressure of the fluid head within the flexible liner forces that liner against the borehole wall. The reactive cover layer thus is pressed firmly directly against the borehole wall, initiating the reaction of the reactive cover layer with the surrounding media with which it is in contact. The strong force of the flexible liner against the borehole wall also causes the flexible liner to drag against the borehole wall, tending to anchor the flexible liner in the borehole and thus further resisting the lifting of flexible liner as the rigid liner is withdrawn.

As detailed in U.S. Pat. No. 6,298,920, the forgoing method is useful to the emplacement of flexible liners inside unstable holes. As the rigid liner is lifted, water is added to the interior of the flexible liner via a central tube to compensate for the increasing volume of the flexible liner as it dilates against the wall. Consequently, where the color reactive layer 13 provides a visual map of the distribution of the pure liquid phase of the NAPL contaminant, the absorbent material 12 allows the chemical assessment of the NAPL and any other contaminant absorbed from the sediment in which the liner 15 was emplaced.

Figure 8:
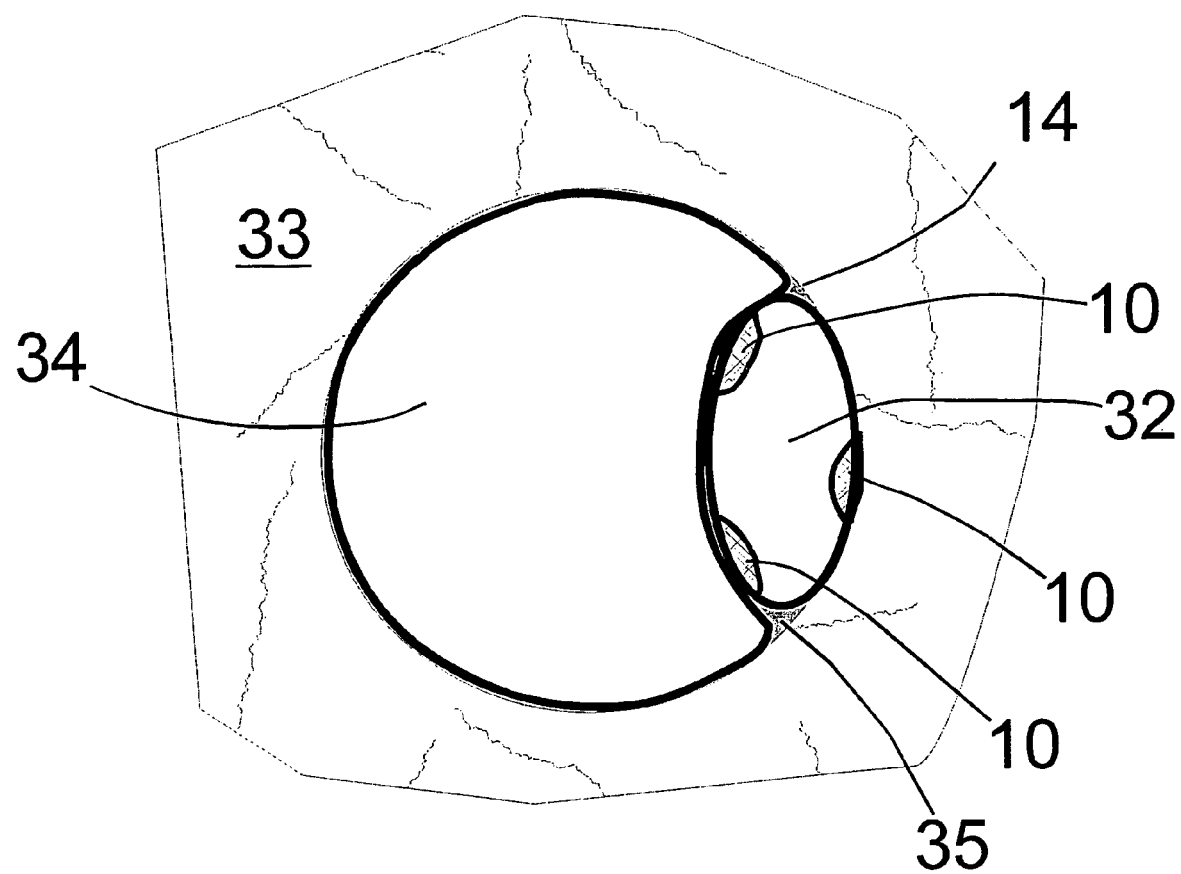
FIG. 8 is a top sectional (radial) view of still another alternative embodiment of an apparatus according to the present disclosure, situated in a subsurface borehole.

Another installation process, adaptable for use in the present method, is to have the absorbent member-bearing liner serve as the second liner explained in U.S. Pat. No. 6,026,900, here incorporated by reference. Reference in this regard is made to FIG. 8. In this alternative, with the installation of a second liner 32 in a single borehole 35, the absorbent member 10 very preferably fully surrounds circumferentially the liner 15. Or, a plurality of several (e.g., three or more, parallel) absorbent members 10 is utilized to assure contact with the borehole wall 14. Also, the second liner 32 may need to be installed through a thin mesh sleeve attached to the first liner 34 to prevent its being trapped in an enlargement of the borehole 35. In each of these installation techniques, the liner with the attached absorbent member 10 is inverted from the borehole to prevent any contaminating contact with other portions of the hole wall 14.

Although the invention has been described in detail with particular reference to these preferred embodiments, other embodiments can achieve the same results. Variations and modifications of the present invention will be obvious to those skilled in the art and it is intended to cover with the appended claims all such modifications and equivalents. The entire disclosures of all applications and patents cited above are hereby incorporated by reference.

What is claimed is:

1. An apparatus for evaluating underground contamination, the apparatus disposable in a borehole having a borehole wall, the apparatus comprising:
    a flexible first liner, defining a tube with a closed end, disposable by eversion in the borehole;
    a retrieval cable, attached to the closed end inside the tube, for retracting the liner from the borehole by inversion; and
    an absorbent member disposed upon the liner, the absorbent member comprising:
        an outer layer, comprising a flexible material of low permeability to water, for preventing immediate saturation of an absorbent material by ambient water residing in the borehole;
        the absorbent material disposed between the liner and the outer layer; wherein when the apparatus is at least partially everted in the borehole, at least a portion of the liner is urged toward the borehole wall by a fluid pressure inside said liner, and at least a portion of the absorbent member is pressed against the borehole wall by the portion of the liner, whereby any contaminants at the borehole wall are at least partially absorbed by the absorbent material; and
        a diffusion barrier, comprising a thin metal film, disposed between the liner and the absorbent material.

2. An apparatus according to claim 1 wherein the liner comprises a flexible plastic liner.

3. An apparatus according to claim 1 wherein the thin metal film comprises aluminum.

4. An apparatus according to claim 1 wherein the outer layer is hydrophobic.

5. An apparatus according to claim 1 wherein the outer layer comprises perforated polyethylene felt.

6. An apparatus according to claim 1 wherein the absorbent material comprises activated carbon felt.

7. An apparatus according to claim 1 wherein the absorbent material comprises a composition selected from the group consisting of cotton felt, polypropylene fibers, and granular carbon in a supporting gel.

8. An apparatus according to claim 1 wherein the diffusion barrier further comprises a thin film of MYLAR biaxially-oriented polyethylene terephthalate.

9. An apparatus according to claim 1 wherein the diffusion barrier comprises a laminate of the thin metal film and a plastic substrate.

10. An apparatus according to claim 1 wherein the absorbent member is detachable from the liner.

11. An apparatus according to claim 1 wherein the at least one absorbent member extends continuously substantially the length of the liner.

12. An apparatus according to claim 1 comprising a plurality of discrete absorbent members disposed at separate locations along the length of the liner.

13. An apparatus according to claim 1 comprising a plurality of at least two absorbent members extending continuously substantially the length of the liner.

14. An apparatus according to claim a 1 wherein the diffusion barrier substantially completely surrounds circumferentially the liner.

15. An apparatus according to claim 14 wherein the complete absorbent member substantially completely surrounds circumferentially the liner.

16. An apparatus according to claim 1 wherein the absorbent member is segmented to define gaps between segments, and wherein segments of the absorbent member are overlapped so to position portions of the diffusion barrier within the gaps to prevent migration of contaminants between segments.

17. An apparatus according to claim 1 further comprising a second liner disposed into the borehole alongside the first liner.

18. An apparatus for evaluating underground contamination, the apparatus disposable in a borehole having a borehole wall, the apparatus comprising:
    a flexible liner disposable in the borehole by eversion, the liner comprising a long tube with a closed end;
    a retrieval cable, attached to the closed end inside the long tube, for retracting the liner from the borehole by inversion; and
    at least one absorbent member removably attached to the liner, the absorbent member comprising:
        an outer layer, comprising a flexible material of low permeability to water for preventing immediate saturation of an absorbent material by any ambient water residing in the borehole while the liner is being everted down the borehole;
        the absorbent material, disposed between the liner and the outer layer, for absorbing any contaminants occurring at the borehole wall; and
        a diffusion barrier, comprising a thin metal film, disposed between the liner and the absorbent material for substantially preventing chemical transport by diffusion from the liner into the absorbent material;
    wherein the at least one absorbent member is carried by the liner when the liner is disposed by eversion down the borehole.

19. An apparatus according to claim 18 wherein the outer layer comprises a tightly woven fabric.

20. An apparatus according to claim 18 wherein the outer layer comprises polyethylene felt.

21. An apparatus according to claim 18 wherein the outer layer is hydrophobic.

22. An apparatus according to claim 18 wherein the absorbent material comprises activated carbon felt.

23. An apparatus according to claim 18 wherein the absorbent material comprises a composition selected from the group consisting of cotton felt, polypropylene fibers, and granular carbon in a supporting gel.

24. An apparatus according to claim 18 wherein the diffusion barrier comprises a laminate of thin metal film and plastic substrate.

25. An apparatus according to claim 24 wherein the thin metal film comprises aluminum.

* * * * *